United States Patent
Lowe et al.

(10) Patent No.: US 12,304,402 B2
(45) Date of Patent: May 20, 2025

(54) ENHANCED FAULT ISOLATION AND MITIGATION FOR PARASITIC LOAD USING SMART ENERGY CENTER

(71) Applicant: GM Global Technology Operations LLC, Detroit, MI (US)

(72) Inventors: Infane Lowe, Grand Blanc, MI (US); Xinyu Du, Oakland Township, MI (US); Lyall Kenneth Winger, Waterloo (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 509 days.

(21) Appl. No.: 17/700,006

(22) Filed: Mar. 21, 2022

(65) Prior Publication Data

US 2023/0294620 A1     Sep. 21, 2023

(51) Int. Cl.
*B60R 16/023* (2006.01)
*B60R 16/033* (2006.01)
*G07C 5/08* (2006.01)
*H02J 7/00* (2006.01)

(52) U.S. Cl.
CPC ........ *B60R 16/0232* (2013.01); *B60R 16/033* (2013.01); *G07C 5/0816* (2013.01); *H02J 7/0048* (2020.01); *H02J 7/0063* (2013.01)

(58) Field of Classification Search
CPC . B60R 16/0232; B60R 16/033; F02N 11/108; F02N 11/14; G01R 31/007; G01R 31/3647; G01R 31/367; G01R 31/371; G01R 31/3842; G01R 31/392; H02J 7/00306; H02J 7/0031; H02J 7/0048; H02J 7/005; H02J 7/0063; H02J 7/00714; H02J 9/002
See application file for complete search history.

(56) References Cited

U.S. PATENT DOCUMENTS

| | | | |
|---|---|---|---|
| 2009/0157335 A1* | 6/2009 | Zhang ................. | G01R 31/382 702/63 |
| 2011/0068746 A1* | 3/2011 | Rocci ................ | H02J 13/00026 320/136 |
| 2017/0253127 A1* | 9/2017 | Ciaccio .................... | B60K 6/28 |
| 2018/0196106 A1* | 7/2018 | Sankavaram ......... | F02N 11/108 |
| 2019/0310623 A1* | 10/2019 | Halonen .............. | G05D 1/0011 |
| 2022/0258647 A1* | 8/2022 | Joao ........................ | B60L 53/24 |

* cited by examiner

*Primary Examiner* — Peter D Nolan
*Assistant Examiner* — Ce Li Li
(74) *Attorney, Agent, or Firm* — CANTOR COLBURN LLP

(57) ABSTRACT

A vehicle, electrical system of the vehicle, and a method of detecting a fault occurring in the electrical system. The electrical system includes an electronic control unit, a sensor configured to obtain a measurement of a parameter of the electronic control unit, and a processor. The processor is configured to determine a parasitic load at the electronic control unit from the measurement of the parameter, identify a type of fault occurring at the electronic control unit due to the parasitic load based on the measurement, and perform an action at the electrical system based on the type of fault.

20 Claims, 7 Drawing Sheets

| Faults | Fault Signature | E-fuse Current | Bus Activity | ECU Activity During Sleep | ECU Malfunction | Drain Duration | Comparison with other Vehicles |
|---|---|---|---|---|---|---|---|
| Hardware Faults | Permanent(Wire/Load) Short. This is Constant Permanent Drain | >20mA /Load | Off | Off | No | Permanent | Higher than Others |
| Software Faults | Module Wake up Unexpected | >20mA /Load | On (PN) | On | No | Periodic | Same as Others (Same Software Version, Under Same Corner Case) |
| | Module not Shutting Off/Sleep (Stuck in Certain Stage) | >20mA /Load | Off | Off | Yes | Permanent | Same as Others (Same Software Version, Under Same Corner Case) |
| Key-off Customer Features | | >20mA /Load | On (PN) | On | No | Random (on Demand) | Higher than Others |

| Faults 428 | | Fault Signature 414 | E-fuse Current 402 | Bus Activity 404 | ECU Activity During Sleep 406 | ECU Malfunction 408 | Drain Duration 410 | Comparison with other Vehicles 412 |
|---|---|---|---|---|---|---|---|---|
| Hardware Faults 420 | | Permanent(Wire/Load) Short. This is Constant Permanent Drain | > 20mA /Load | Off | Off | No | Permanent | Higher than Others |
| Software Faults 424 | 422a | Module Wake up Unexpected 422 | > 20mA /Load | On (PN) | On | No | Periodic | Same as Others (Same Software Version, Under Same Corner Case) |
| | 422b | Module not Shutting Off/Sleep (Stuck in Certain Stage) | > 20mA /Load | Off | Off | Yes | Permanent | Same as Others (Same Software Version, Under Same Corner Case) |
| Key-off Customer Features | | | > 20mA /Load | On (PN) | On | No | Random (on Demand) | Higher than Others |

FIG. 4

ENHANCED FAULT ISOLATION AND MITIGATION FOR PARASITIC LOAD USING SMART ENERGY CENTER

INTRODUCTION

The subject disclosure relates to diagnosing and mitigating the effects of a parasitic load in an electrical system of a vehicle, and, in particular, to classifying a type of fault associated with the parasitic load and performing a remedial course of action based on the type of fault.

A vehicle has multiple electrical units for performing various operations at the vehicle. For example, electrical units can operate a starting motor, operate power windows, control electronic communications, entertainment systems, etc. A parasitic load or electrical fault at any of these electrical units can produce a drain at a battery of the vehicle. While charge and current on the battery can be monitored and reported for vehicle maintenance and repair, such monitoring is broad-based and does not provide guidance on how to improve the electrical unit or prevent further occurrences of the fault. Accordingly, it is desirable to provide a system and method for diagnosing a type of fault occurring at the electrical system in order to improve electrical unit design and mitigate of the drain on the battery.

SUMMARY

In one exemplary embodiment, a method of detecting a fault occurring in an electrical system of a vehicle is disclosed. A measurement of a parameter of an electronic control unit of the electrical system is obtained. A parasitic load at the electronic control unit is determined from the measurement of the parameter. A type of fault occurring at the electronic control unit due to the parasitic load is identified based on the measurement. An action is performed at the electrical system based on the type of fault.

In addition to one or more of the features described herein, the type of fault is at least one of: a hardware fault, a software fault, and a customer-generated fault. The method further includes predicting a state of charge (SOC) level of a battery of the electrical system and estimating a drain time for the battery based on the SOC level and the type of fault. Estimating the drain time further includes at least one of predicting the drain time for a permanent drain, predicting the drain time for a periodic drain, and predicting the drain time due to random drain. Performing the action further includes at least one of changing hardware design of the electronic control unit, changing a software design of the electronic control unit, mitigating a drain on a battery due to the parasitic load, and generating a warning signal. The method further includes generating the warning signal when an estimated discharge time is greater than a time threshold. The method further includes controlling an operation of the electronic control unit to mitigate an effect of the drain on the battery.

In another exemplary embodiment, an electrical system of a vehicle is disclosed. The electrical system includes an electronic control unit, a sensor configured to obtain a measurement of a parameter of the electronic control unit, and a processor. The processor is configured to determine a parasitic load at the electronic control unit from the measurement of the parameter, identify a type of fault occurring at the electronic control unit due to the parasitic load based on the measurement, and perform an action at the electrical system based on the type of fault.

In addition to one or more of the features described herein, the type of fault is at least one of a hardware fault, a software fault, and a customer-generated fault. The processor is further configured to predict a state of charge (SOC) level of a battery of the electrical system and estimate a drain time for the battery based on the SOC level and the type of fault. The processor is further configured to estimate the drain time by performing at least one of predicting the drain time for a permanent drain, predicting the drain time for a periodic drain, and predicting the drain time due to random drain. The action further includes at least one of changing hardware design of the electronic control unit, changing a software design of the electronic control unit, mitigating a drain on a battery due to the parasitic load, and generating a warning signal. The processor is further configured to generate the warning signal when an estimated discharge time is greater than a time threshold. The processor is further configured to control an operation of the electronic control unit to mitigate an effect of the drain on the battery.

In yet another exemplary embodiment, a vehicle is disclosed. The vehicle includes an electronic control unit, a sensor configured to obtain a measurement of a parameter of the electronic control unit, and a processor. The processor is configured to determine a parasitic load at the electronic control unit from the measurement of the parameter, identify a type of fault occurring at the electronic control unit due to the parasitic load based on the measurement and perform an action at the vehicle based on the type of fault.

In addition to one or more of the features described herein, the type of fault is at least one of a hardware fault, a software fault, and a customer-generated fault. The processor is further configured to predict a state of charge (SOC) level of a battery of the vehicle and estimate a drain time for the battery based on the SOC level and the type of fault. The processor is further configured to estimate the drain time by performing at least one of predicting the drain time for a permanent drain, predicting the drain time for a periodic drain, and predicting the drain time due to random drain. The action further includes at least one of changing hardware design of the electronic control unit, changing a software design of the electronic control unit, mitigating a drain on a battery due to the parasitic load, and generating a warning signal. The processor is further configured to perform at least one of generating the warning signal when an estimated discharge time is greater than a time threshold and controlling operation of the electronic control unit to mitigate an effect of the drain on the battery.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 4 shows an illustrative table suitable for use in classifying a parasitic load based on the measurements in the first snapshot;

DETAILED DESCRIPTION

Figure 1:
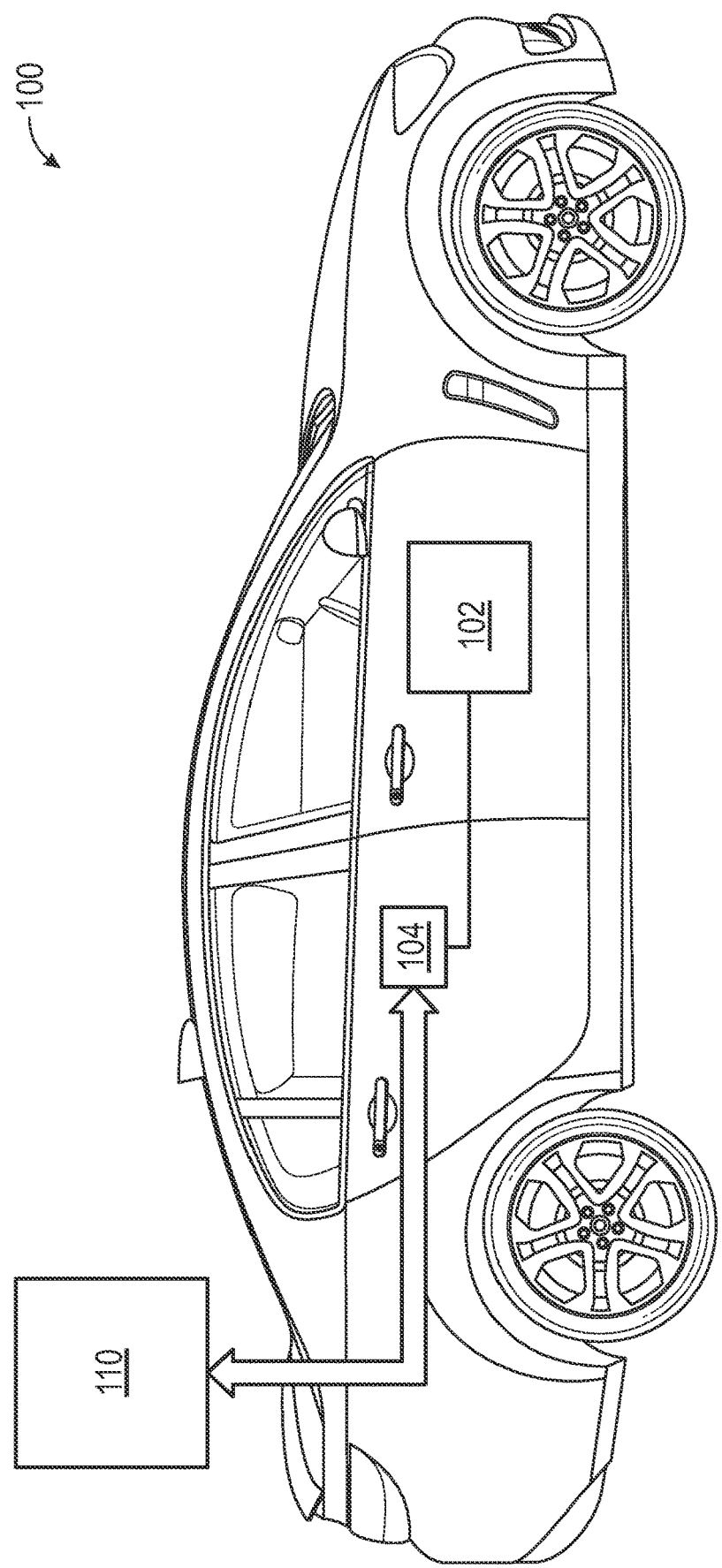
FIG. 1 shows a vehicle, in an exemplary embodiment.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In accordance with an exemplary embodiment, FIG. 1 shows a vehicle 100. The vehicle 100 generally includes an electrical system 102 and a communication system 104. The electrical system 102 includes components for controlling various electrical operations of the vehicle, such as a starter motor, a generator, power windows, electrical communications, entertainment systems, etc. The electrical system 102 can monitor these components and obtain electrical measurements and diagnosis any faults occurring with these components. The measurements, diagnoses and other data can be sent to the communication system 104. The communication system 104 relays measurements, diagnoses and other data to a remote server 110. The remote server can be a manufacturer's server or a server at a maintenance repair shop, in various embodiments.

Figure 2:
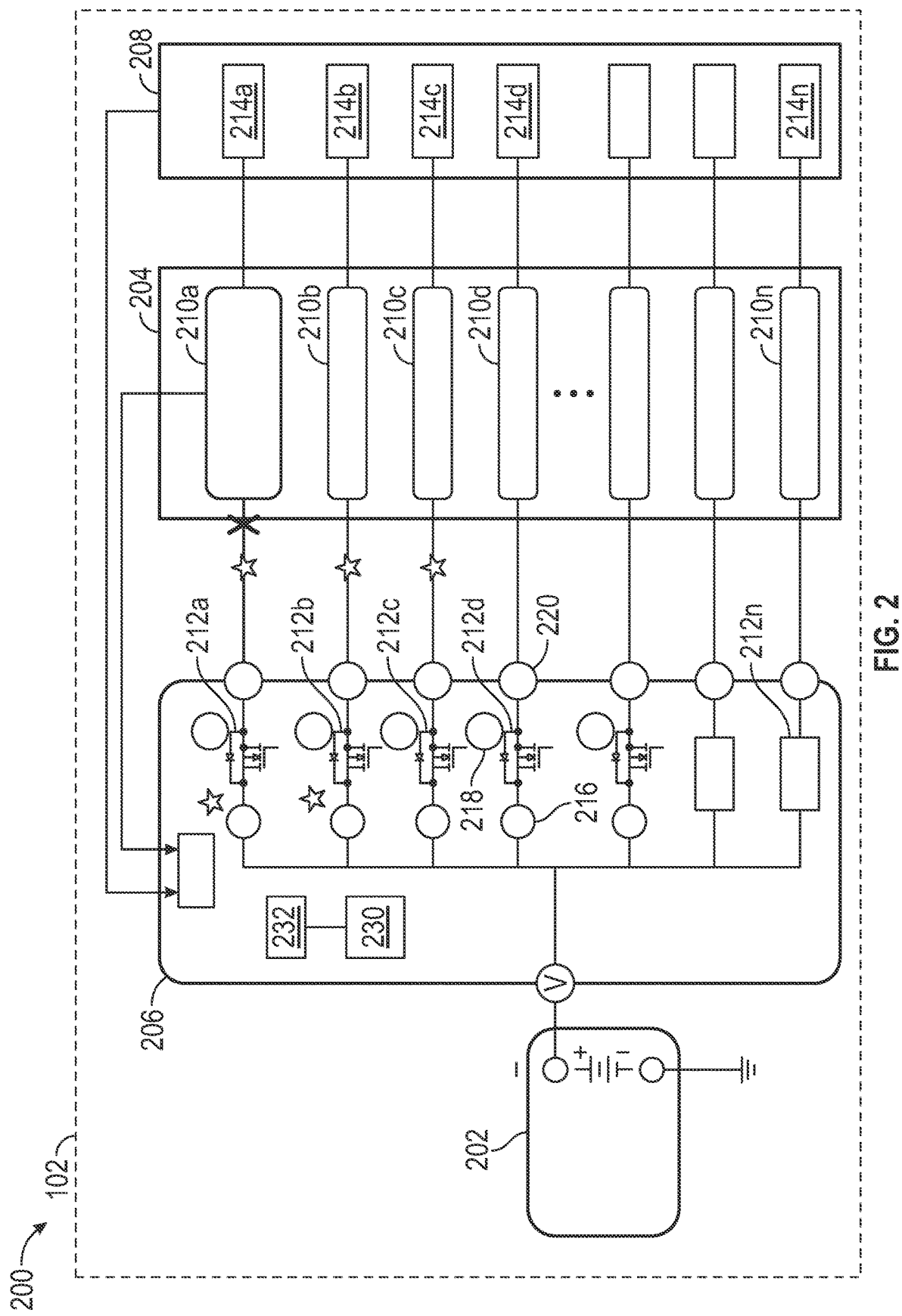
FIG. 2 shows a schematic diagram of the electrical system of the vehicle.

FIG. 2 shows a schematic diagram 200 of the electrical system 102 of the vehicle 100. The electrical system 102 includes a power source or battery 202, a electronic control center 204, a smart energy center (SEC) 206, and a central gateway module (CGM) 208.

The electronic control center 204 includes a plurality of electronic control units (ECUs) 210a-210n. Each ECU 210a-210n is dedicated to controlling an electrical load of the vehicle 100, such as power windows, electronic communications, speedometer, air conditioning units, entertainment systems, starter, generator, etc.

The smart energy center 206 is a control circuit that includes a plurality of electronic fuses 212a-212n, each electronic fuse controlling an electrical connection between the battery 202 and one of the ECUs 210a-210n. Each of the electronic fuses 212a-212n is electrically coupled, respectively, to a corresponding ECU 210a-210n of the electronic control center 204 via an electrical wire or electrical branch. The electronic fuses 212a-212n can be MOSFETs (metal-oxide-semiconductor field-effect transistors) in various embodiments. Each electronic fuse has an associated group of sensors, such as current sensor 216, temperature sensor 218 and voltage sensor 220 (which are shown with respect to electronic fuse 212d for illustrative purposes) that provides measurements of the current, voltage and temperature, respectively, of their associated electronic fuse.

The smart energy center 206 includes a processor 230 that monitors the electronic fuses 212a-212n based on the measurement from the sensors, among other measurements. From these measurements, the processor 230 can identify a location of a parasitic load at any of the ECUs 210a-210n. A parasitic load is a load that consumes power even when an ECU is shut off. The processor 230 can determine which branch or which of the ECUs 210a-210n is experiencing the parasitic load. By monitoring the current, the SEC 206 can determine a rate at which the parasitic load is draining the battery and/or a time at which the parasitic load is expected to drain the battery or reduce the charge on the battery to a selected charge value.

The CGM 208 is a monitoring unit or module that monitors the operation of the electronic control center 204. The CGM 208 includes monitoring units 214a-214n which monitor bus activity at respective ECUs 210a-210n. The CGM 208 can also monitor whether there is activity at a selected ECU (i.e., ECU 210a) while the selected ECU is in a sleep mode. In another aspect, the ECU 210a can monitor itself and report any malfunctions at the ECU to the CGM 208.

The processor 230 therefore receives current, voltage and temperature measurements from the sensors, as well as bus activity, ECU activity during sleep and ECU malfunction information from the CGM 208. The processor 230 can record these measurements and calculations based on the measurements in a snapshot to a memory storage device 232.

Figure 3:
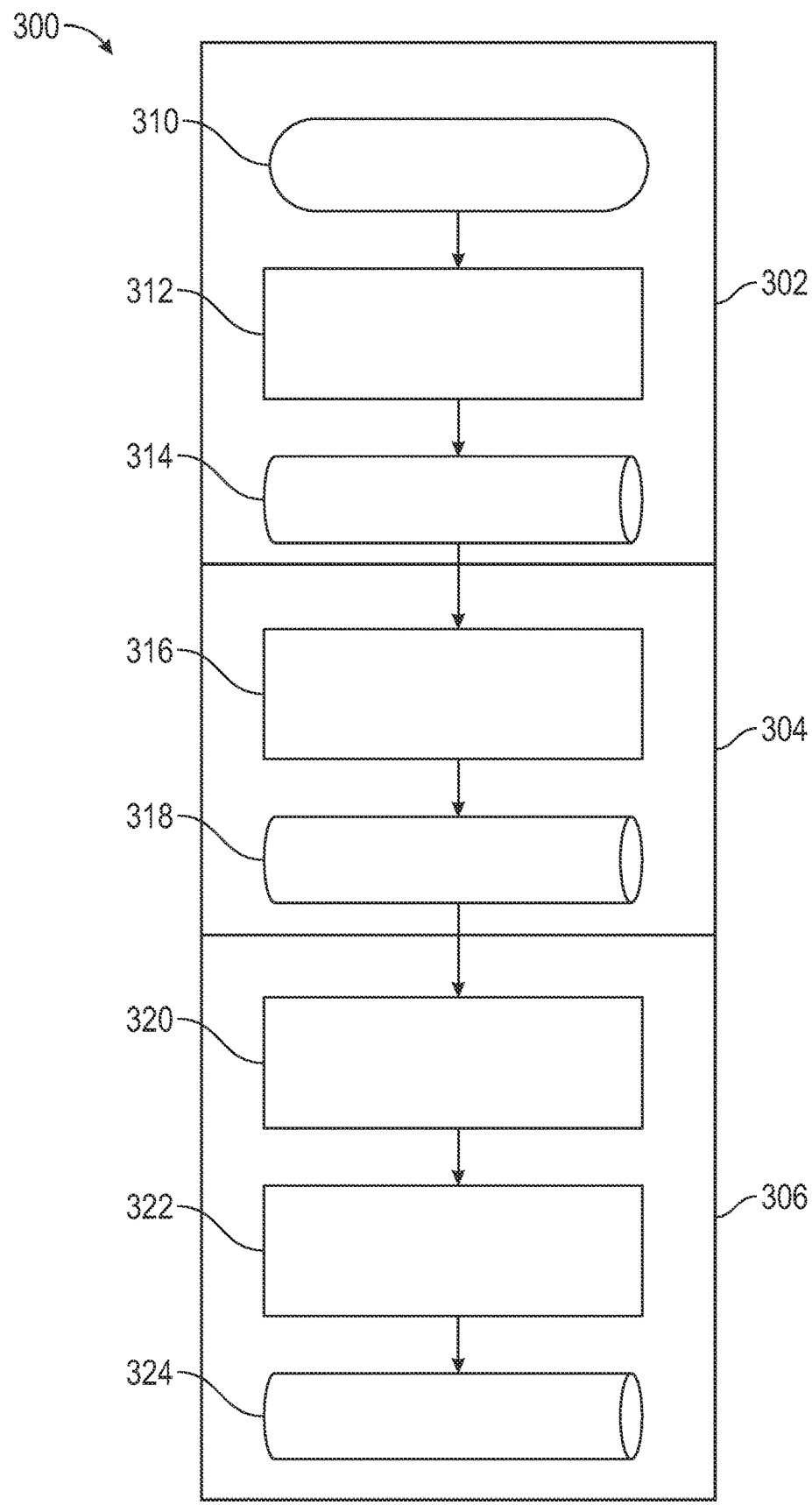
FIG. 3 shows a flowchart of a method for performing a fault detection, isolation and mitigation in the battery system, in an illustrative embodiment.

FIG. 3 shows a flowchart 300 of a method for performing a fault isolation and mitigation in the electrical system 200, in an illustrative embodiment. The method includes three phases: a detection phase 302 a classification phase 304 and a mitigation phase 306. The detection phase 302 includes determining which branch or which ECU is experiencing a fault or parasitic load. In the classification phase 304, the type of fault corresponding to the parasitic load is isolated and categorized. In the mitigation phase 306, steps are taken to mitigate any drain on the battery due to the parasitic load.

The detection phase 302 starts at box 310. In box 312, the current is measured at each electronic fuse 212a-212n of the smart energy center 206. The measurement can be conditioned using an appropriate filter, such as a moving average filter, a Kalman filter, etc. The measurement can also include various signals received from the CGM 208, such as bus activity, ECU activity during sleep, an ECU malfunction, etc. In box 314, the current signal and other measurements are stored to memory storage device 232 as a first snapshot that represents the state of one or more of the ECUs 210a-210n at a given time.

The classification phase 304 starts at box 316. In box 316, the first snapshot is retrieved and analyzed to determine a type of fault or fault class for the parasitic load. In box 318, the type of fault is stored at the memory storage device 232 as a second snapshot.

The mitigation phase 306 starts at box 320. At box 320, the processor 230 determines a state of charge (SOC) on the battery 202 as well as a drain rate on the battery 202. The processor 230 determines these parameters based on a type of fault determined in box 316. The processor 230 generates an alert to the customer that indicates the predicted drain time. In box 322, the processor 230 sets a diagnostic trouble code (DTC) and/or performs a mitigation step based on the type of fault. The mitigation step can include a sleep reinitialization, a soft or hard cut-off to the e-fuse, etc. In box 324, the data determined during the mitigation phase 306 (e.g., diagnostic trouble code, SOC, mitigation step) is stored at the memory storage device 232 as a third snapshot.

FIG. 4 shows an illustrative table 400 suitable for use in classifying a parasitic load based on the measurements in the first snapshot. The illustrative table 400 includes columns 402-412 indicating parameters that characterize a signature 414 of the parasitic load and rows 420, 422, 424 that indicate the fault type 428. The parameter of column 402 is an e-fuse current parameter. A magnitude of the current at the electronic fuse is compared to a current threshold. In the illustrative embodiment, the current threshold is 20 milliamps (mA). The e-fuse current parameter indicates whether the current is greater than the current threshold or not. The parameter of column 404 is bus activity, which is measured at the CGM 208 and which can be either ON or OFF. The parameter of column 406 is the state of the ECU, which is measured at the CGM 208 and which can be either ON or OFF.

The parameter of column 408 indicates the presence an ECU malfunction. The ECU can monitor itself and provide a value to the CGM when an error or malfunction occurs. The parameter of column 410 is the drain duration, which can be measured at the SEC 206. The drain duration can be classified either as a permanent drain time (a drain time based on a permanent parasitic load), a periodic drain time (a drain time based on a periodic parasitic load) or a random drain duration (a drain time based on a randomly generated parasitic load).

The parameter of column 412 is a value that indicates the results of a comparison of the current value of a load at an ECU with current values obtained at ECUS of other vehicles. The other vehicles are generally vehicles that are of the same or equivalent type or class, such as a sedan class or truck class.

The processor 230 is able to determine the type of fault based on the state of the parameters of columns 402-412. Row 420 indicates a hardware fault, such as can occur with a short in a wire or load. Row 422 indicates a software fault. The software fault can occur, for example, by the module or electronic control unit waking up unexpectedly (sub-row 422*a*) or by the module or electronic control unit not shutting off or going to sleep (sub-row 422*b*)

When a current at an electronic fuse is greater than 20 mA, the bus activity is off, ECU activity is off during sleep mode, the ECU is not malfunctioning, the drain duration is a permanent drain and the value of the drain duration is higher than expected in other vehicles of the same vehicle class, the processor determines the occurrence of a hardware fault (Row 420).

When a current at an electronic fuse is greater than 20 mA, the bus activity is on, ECU activity is on during sleep mode, the ECU is not malfunctioning, the drain duration is a periodic drain and the value of the drain duration is the same as expected in other vehicles of the same vehicle class, the processor determines the occurrence of a software fault based on an unexpected wake-up of the module (Row 422*a*).

When a current at an electronic fuse is greater than 20 mA, the bus activity is off, ECU activity is off during sleep mode, there is a malfunction at the ECU, the drain duration is a permanent drain and the value of the drain duration is the same as expected in other vehicles of the same vehicle class, the processor determines the occurrence of a software fault based on a module not being able to shut off (Row 422*b*).

When a current at an electronic fuse is greater than 20 mA, the bus activity is on, ECU activity is on during sleep mode, the ECU is not malfunctioning, the drain duration is a random drain and the value of the drain duration is higher than expected in other vehicles of the same vehicle class, the processor determines the occurrence of a customer-related drain on the module (Row 424), generally due to a customer-generated fault.

Figure 5:
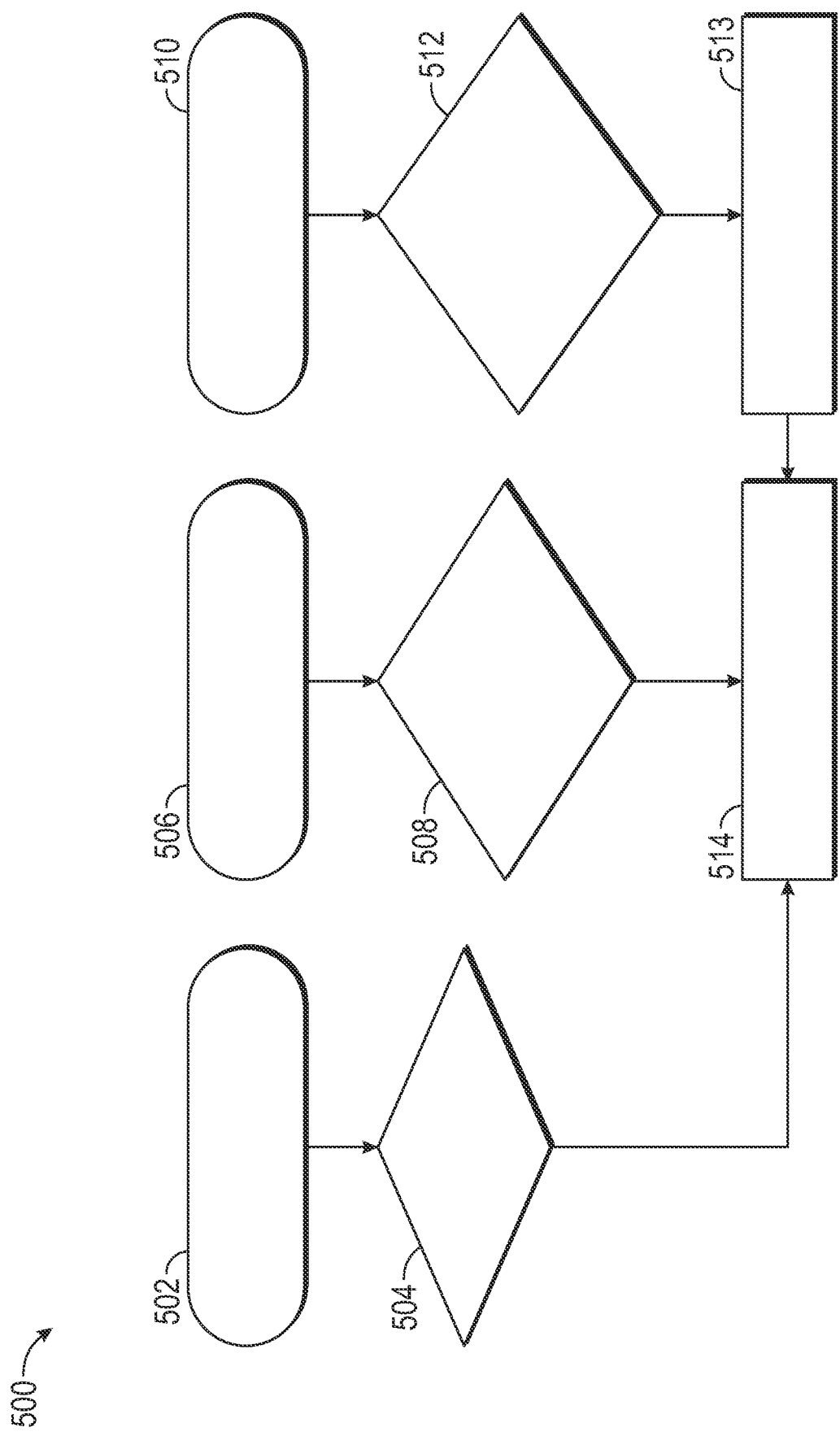
FIG. 5 shows a flowchart indicating a procedure for data gathering based on the type of fault.

FIG. 5 shows a flowchart 500 indicating a procedure for data gathering based on the type of fault. In box 502, a hardware fault is determined at an ECU or ECU branch. In box 504, the voltage and current measurements are made of the electronic fuse that corresponds to the ECU. The voltage and current measurements are stored at the second snapshot in box 514. In box 506, a software fault is determined at the ECU or ECU branch. In box 508, the processor creates a histogram of ECU wake-up frequency and current amplitude. This data is stored at the second snapshot in box 514. In box 510, a customer-related drain on the ECU is determined. In box 512, the processor 230 looks into a look-up table for features with a highest design failure mode severity and customer dissatisfaction. In box 513, this data can be transmitted to the vehicle via the communication system 104. In box 514, this data is stored at the second snapshot.

Figure 6:
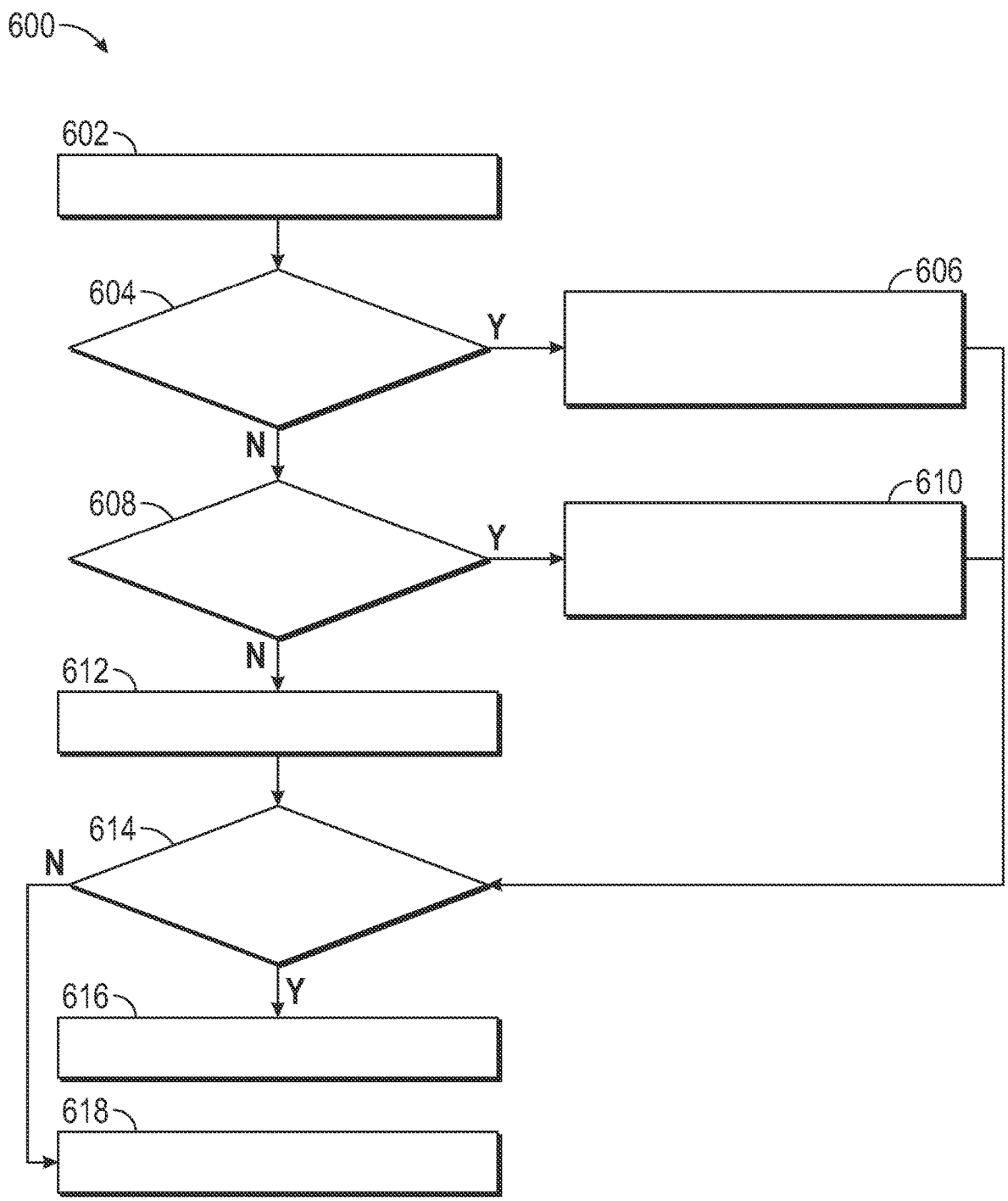
FIG. 6 shows a flowchart illustrating a method of drain mitigation based on a drain duration.

FIG. 6 shows a flowchart 600 illustrating a method of drain mitigation based on a drain duration. In box 602, a fault is detected. In box 604, the processor 230 determines whether the fault is a hardware fault. If the drain is a result of a hardware fault, then the method proceeds to box 606 in which the processor calculates a predicted drain time that is expected due to the hardware fault. The calculation for a permanent or hardware drain is shown in Eqs. (1)-(3):

$$SOC_0 = SOC_{end} + \int_0^{t_{pm}} \frac{I}{C} dt \qquad \text{Eq. (1)}$$

$$SOC_0 = SOC_{end} + t_{pm}\frac{I}{C} \qquad \text{Eq. (2)}$$

$$t_{pm} = \frac{(SOC_0 - SOC_{end})}{\frac{I}{C}} \qquad \text{E.q (3)}$$

where $SOC_0$ is the current state of charge of the battery, $SOC_{end}$ is a threshold state of charge value, which can be a preselected value, $t_{pm}$ is the drain time for a permanent drain on the battery, I is the current at the ECU, C is a charge at the ECU. $SOC_0$ is a known quantity, either from a sensor measurement or an SOC estimation algorithm operating on a sensor measurement. The method proceeds from box 606 to box 614. In box 614, the predicted drain time is compared to a duration threshold and an action is taken based on the comparison.

Returning to box 604, if the processor 230 determines that the fault is not a hardware fault, the method proceeds to box 608. In box 608, the processor 230 determines whether the fault is a software fault. If the fault is a software fault, the method proceeds to box 610. In box 610, the processor 230 calculates a predicted drain time that is expected due to the software fault. The calculations for the periodic or software drain time is shown in Eqs. (4)-(6):

$$dSOC = \frac{\left(\int_{t=0}^{P} \frac{I}{C} dt\right)}{P} \qquad \text{Eq. (4)}$$

$$SOC_0 = SOC_{end} + t_{pr} * dSOC \qquad \text{Eq. (5)}$$

$$t_{pr} = \frac{(SOC_0 - SOC_{end})}{dSOC} \qquad \text{Eq. (6)}$$

where P is a period of the periodic drain and $t_{pr}$ is a drain time for a periodic drain on the battery due to the software fault. From box 610, the method can proceed to box 614.

Returning to box 608, if the fault is not a software fault, the method proceeds to box 612. In box 612, the processor 230 estimates a drain time based on random drain events. A historical record of SOC with time can be obtained and curve fitting can be used to determine an equation of SOC with time. The drain time can then be stated as a function of the state of charge SOC, as shown in Eq. (7):

$$t_r = f(SOC) \quad \text{Eq. (7)}$$

where $t_r$ is the predicted drain time for a random drain event. At any time n, $t_r = t_n - t_0$, where $t_0$ is the present time. From box 612, the method proceeds to box 614.

In box 614, the predicted drain time is compared to a pre-defined drain time threshold T1. If the drain time (i.e., $t_{pm}$, $t_{pr}$ or $t_r$) is greater than the time threshold T1, the method proceeds to box 616. In box 616, an alert signal or warning signal is generated. The alert signal can be sent to the customer or driver, to a manufacturer or to a repair station, in various embodiments. Returning to box 614, if the drain time (i.e., $t_{pm}$, $t_{pr}$ or $t_r$) is less than or equal to the threshold T1, the method proceeds to box 618. In box 618, mitigation steps are taken in order to reduce or minimize the effects of the parasitic load in draining the battery 202.

Figure 7:
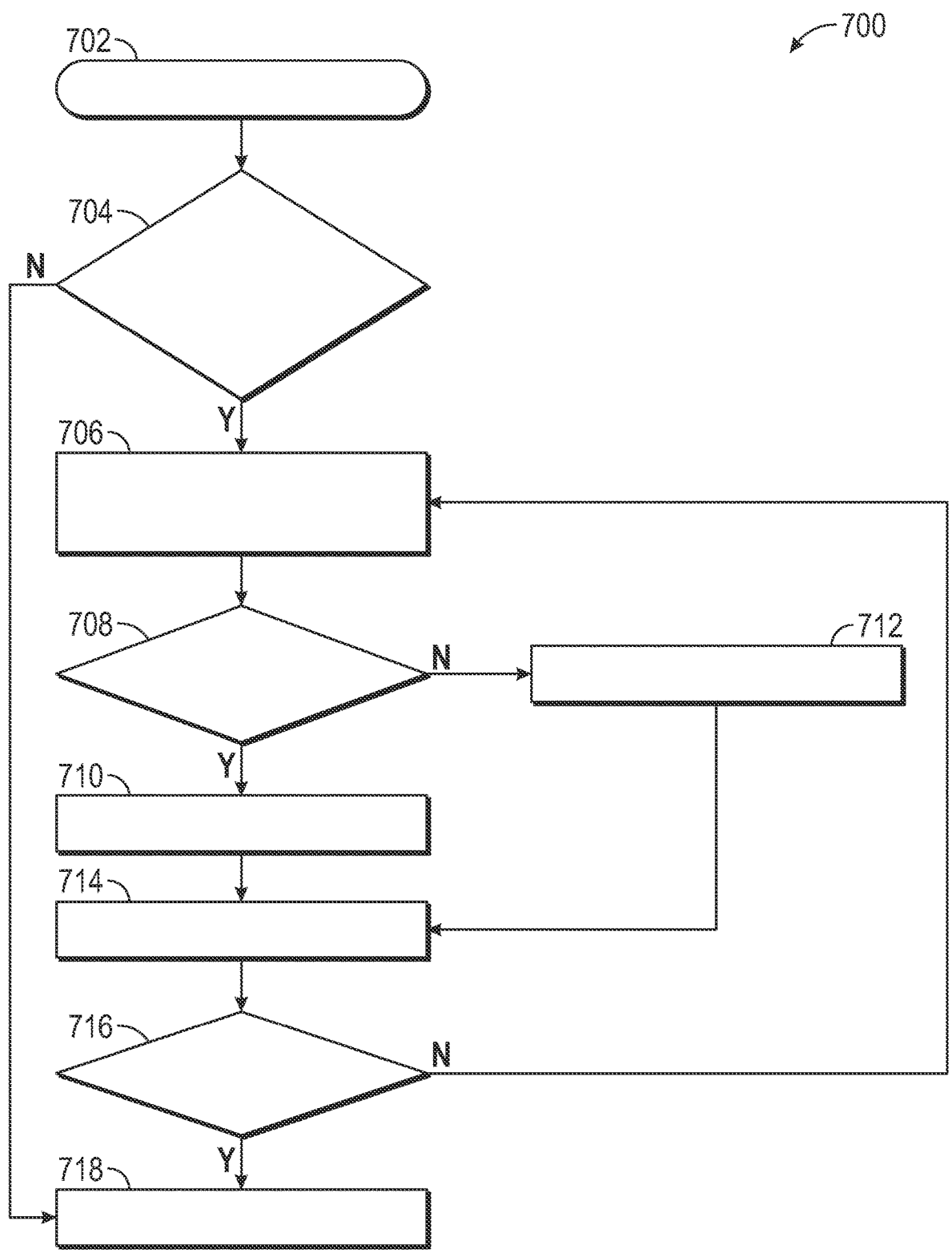
FIG. 7 shows a flowchart of a mitigation process for the electrical system.

FIG. 7 shows a flowchart 700 of a mitigation process for the electrical system. In box 702, the mitigation process is initialized. In box 704, the decay rate in the SOC and/or the predicted drain time is compared to relevant thresholds. If the predicted decay time is greater than a threshold decay time (or alternatively, if the SOC decay rate is greater than a decay rate threshold), the method proceeds to box 706. On the other hand, if the predicted decay time is less than or equal to the threshold decay time (or alternatively, if the SOC decay rate is less than or equal to the decay rate threshold), the method proceeds to box 718. In box 718, a hard reset of the ECU is performed, by turning off and on the ECU.

In box 706, the fault type and predicted drain time (or drain rate) are stored. In box 708, the fault type is checked to determine whether the fault type causes a permanent drain. If the fault type causes a permanent drain, the method proceeds to box 710. If the fault type does not cause a permanent drain (i.e., causes a periodic or random drain), the method proceeds to box 712.

In box 710 a soft reset is performed, which can be a software reboot or reinitialization. In box 712, a sleep reinitialization is performed. From either box 710 or box 712, the method proceeds to box 714. In box 714, a counter is increased. The counter tracks the number of times either the soft resent or the sleep reinitialization is performed. In box 716, if the counter is greater than a count threshold, the method proceeds to box 718 and a hard reset is performed. If instead at box 716, the counter is less than or equal to the count threshold, the method can return to box 706 and an additional round of soft resets or sleep reinitializations can be performed.

In other embodiments, a software can be redesigned for the electronic control unit when the drain is due to a software design.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of detecting a fault occurring in an electrical system of a vehicle, comprising:
   obtaining a measurement of a parameter of an electronic control unit of the electrical system;
   determining a parasitic load at the electronic control unit from the measurement of the parameter;
   identifying a fault class for the parasitic load based on the measurement;
   estimating a drain time for the battery using calculations selected based on the fault class and a current state of charge of the battery; and
   controlling an operation of the electronic control unit to mitigate an effect of the drain on the battery based on the fault class when the drain time is less than a time threshold.

2. The method of claim 1, wherein the fault class is at least one of: (i) a hardware fault; (ii) a software fault; and (iii) a customer-generated fault.

3. The method of claim 1, wherein estimating the drain time further comprises at least one of: (i) predicting the drain time for a permanent drain; (ii) predicting the drain time for a periodic drain; and (iii) predicting the drain time due to random drain.

4. The method of claim 1, wherein performing the action further comprises at least one of: (i) changing hardware design of the electronic control unit; (ii) changing a software design of the electronic control unit; and (iii) mitigating a drain on a battery due to the parasitic load.

5. The method of claim 1, further comprising generating a warning signal when the drain time is greater than the time threshold.

6. The method of claim 1, further comprising determining the fault class based on a fault signature that includes at least one of: (i) the electronic control unit waking up unexpectedly; and (ii) the electronic control unit not shutting off.

7. The method of claim 1, further comprising conveying the fault class to a remote server.

8. An electrical system of a vehicle, comprising:
   an electronic control unit;
   a sensor configured to obtain a measurement of a parameter of the electronic control unit;
   a processor configured to:
     determine a parasitic load at the electronic control unit from the measurement of the parameter;
     identify a fault class for the parasitic load based on the measurement;
     estimate a drain time for the battery using calculations selected based on the fault class and a current state of charge of the battery; and
     control an operation of the electronic control unit to mitigate an effect of the drain on the battery based on the fault class when the drain time is less than a time threshold.

9. The electrical system of claim 8, wherein the fault class is at least one of: (i) a hardware fault; (ii) a software fault; and (iii) a customer-generated fault.

10. The electrical system of claim 8, wherein the processor is further configured to estimate the drain time by performing at least one of: (i) predicting the drain time for a permanent drain; (ii) predicting the drain time for a periodic drain; and (iii) predicting the drain time due to random drain.

11. The electrical system of claim 8, wherein the action further comprises at least one of: (i) changing hardware design of the electronic control unit; (ii) changing a software design of the electronic control unit; and (iii) mitigating a drain on a battery due to the parasitic load.

12. The electrical system of claim 8, wherein the processor is further configured to generate a warning signal when the drain time is greater than the time threshold.

13. The electrical system of claim 8, wherein the processor is further configured to determine the fault class based on a fault signature that includes at least one of: (i) the electronic control unit waking up unexpectedly; and (ii) the electronic control unit not shutting off.

14. The electrical system of claim 8, further comprising a communication system for conveying the fault class to a remote server.

15. A vehicle, comprising:
    an electronic control unit;
    a sensor configured to obtain a measurement of a parameter of the electronic control unit;
    a processor configured to:
       determine a parasitic load at the electronic control unit from the measurement of the parameter;
       identify a fault class for the parasitic load based on the measurement; and
       estimate a drain time for the battery using calculations selected based on the fault class and a current state of charge of the battery; and
       control an operation of the electronic control unit to mitigate an effect of the drain on the battery based on the fault class when the drain time is less than a time threshold.

16. The vehicle of claim 15, wherein the type of fault class is at least one of: (i) a hardware fault; (ii) a software fault; and (iii) a customer-generated fault.

17. The vehicle of claim 15, wherein the processor is further configured to estimate the drain time by performing at least one of: (i) predicting the drain time for a permanent drain; (ii) predicting the drain time for a periodic drain; and (iii) predicting the drain time due to random drain.

18. The vehicle of claim 15, wherein the action further comprises at least one of: (i) changing hardware design of the electronic control unit; (ii) changing a software design of the electronic control unit; and (iii) mitigating a drain on a battery due to the parasitic load.

19. The vehicle of claim 15, wherein the processor is further configured to generate a warning signal when the estimated discharge time is greater than the time threshold.

20. The vehicle of claim 15, further comprising a communication system for conveying the fault class to a remote server.

* * * * *